US011354009B2

(12) United States Patent
Hill et al.

(10) Patent No.: US 11,354,009 B2
(45) Date of Patent: Jun. 7, 2022

(54) METHOD AND APPARATUS FOR USING GESTURES ACROSS MULTIPLE DEVICES

(71) Applicant: Nureva, Inc., Calgary (CA)

(72) Inventors: Doug Hill, Calgary (CA); Taco Van Ieperen, Calgary (CA)

(73) Assignee: NUREVA, INC.

( * ) Notice: Subject to any disclaimer, the term of this patent is extended or adjusted under 35 U.S.C. 154(b) by 0 days.

(21) Appl. No.: 16/690,766

(22) Filed: Nov. 21, 2019

(65) Prior Publication Data
US 2020/0089374 A1    Mar. 19, 2020

Related U.S. Application Data

(63) Continuation of application No. 15/578,938, filed as application No. PCT/CA2016/050660 on Jun. 10, 2016, now abandoned.
(Continued)

(51) Int. Cl.
*G06F 3/04883* (2022.01)
*G06F 3/0481* (2022.01)
(Continued)

(52) U.S. Cl.
CPC .......... *G06F 3/0481* (2013.01); *G06F 3/0485* (2013.01); *G06F 3/04845* (2013.01);
(Continued)

(58) Field of Classification Search
None
See application file for complete search history.

(56) References Cited

U.S. PATENT DOCUMENTS 6,331,840 B1    12/2001    Nielsen et al.
6,545,669 B1 *   4/2003    Kinawi ................ G06F 3/0486
                                                    345/1.1
(Continued)

FOREIGN PATENT DOCUMENTS

EP    2 241 962 A2    10/2010
WO    2013046182 A2    4/2013

OTHER PUBLICATIONS

First Examination Report dated Dec. 4, 2019, from European Patent Application No. 16806479.8, 6 sheets.
(Continued)

*Primary Examiner* — Rinna Yi
(74) *Attorney, Agent, or Firm* — Katten Muchin Rosenman LLP (57) ABSTRACT

Method and apparatus for implementing gestures across user interface display apparatuses, including detecting and saving, at a first user interface display apparatus, an initial user input; determining whether the initial user input is within a predetermined proximity to a boundary with a second user interface display apparatus; detecting and saving additional user input continuing from the initial user input; when the initial user input is within the predetermined proximity, incorporating additional information from a transition message received within a predetermined time period from the second user interface display apparatus to the saved user input, the predetermined time period corresponding to a message time between the first and second user interface display apparatuses from a of the initial user input; and implementing the saved user input on one or mole of the first and second user interface display apparatuses.

21 Claims, 7 Drawing Sheets

Related U.S. Application Data (60) Provisional application No. 62/175,029, filed on Jun. 12, 2015.

(51) Int. Cl.
    *G06F 3/14* (2006.01)
    *G06F 3/04845* (2022.01)
    *G06F 3/0485* (2022.01)

(52) U.S. Cl.
    CPC ........ *G06F 3/04883* (2013.01); *G06F 3/1446* (2013.01); *G09G 2354/00* (2013.01)

(56) References Cited

U.S. PATENT DOCUMENTS

| | | |
|---|---|---|
| 8,330,733 B2 | 12/2012 | Petschnigg et al. |
| 8,751,970 B2 | 6/2014 | Hinckley et al. |
| 2005/0093868 A1* | 5/2005 | Hinckley ................ G06F 3/011 345/502 |
| 2007/0124503 A1 | 5/2007 | Ramos et al. |
| 2010/0309158 A1 | 12/2010 | Iwayama et al. |
| 2011/0090155 A1 | 4/2011 | Caskey et al. |
| 2011/0209057 A1 | 8/2011 | Hinckley et al. |
| 2011/0231783 A1* | 9/2011 | Nomura ................ G06F 3/0488 715/761 |
| 2011/0291964 A1 | 12/2011 | Chambers et al. |
| 2013/0176255 A1* | 7/2013 | Kim .......................... G06F 3/01 345/173 |
| 2013/0321310 A1 | 12/2013 | Yen et al. |
| 2014/0028590 A1* | 1/2014 | Itaya ................... G06F 3/04886 345/173 |

OTHER PUBLICATIONS

Non-Final Rejection dated Dec. 31, 2018, from U.S. Appl. No. 15/578,938, 28 sheets.
International Search Report and Written Opinion dated Sep. 15, 2016, from PCT/CA2016/050660, 7 sheets.
Extended European Search Report for European Patent Application No. 16806479.8 dated Dec. 20, 2018.

* cited by examiner

METHOD AND APPARATUS FOR USING GESTURES ACROSS MULTIPLE DEVICES

CROSS-REFERENCE TO RELATED APPLICATIONS

This application is a continuation of U.S. patent application Ser. No. 15/578,938, filed Dec. 1, 2017, which is a 371 of International Appln. No. PCT/CA2016/050660, filed Jun. 10, 2016 which claims priority from U.S. Patent Appln. No. 62/175,029, filed Jun. 12, 2015 the contents of all incorporated herein by reference.

BACKGROUND OF THE INVENTION

Field of the Invention

The present invention generally relates to a computer system for managing user interfaces and displays across multiple devices. And, more specifically, the present invention is directed to methods and apparatuses for implementing user interface inputs that span multiple devices.

Description of Related Art

Server-based software which allows multiple users to edit a shared document has become common. This software can be executed on touch displays that are physically adjacent. In some situations (high performance, for example), it is preferable that each display is controlled by a separate computer connected to the same shared digital workspace, making independent display units. When these displays are coordinated through the server, they can be made to appear as if they are a single view of an electronic document or object and of a shared contiguous background. One problem with this setup is that gestures happen in real-time, but communication between the displays is delayed by the message transfer time through the server. And since touch events are in real-time, the displays are not guaranteed to have the same version of the document and, thus, the touch event may be processed incorrectly between the displays. This is particularly problematic when the user initiates a gesture on one display and continues that gesture on the second display, because the second display may not have enough information to continue with the action properly. For example, when the user drags an object from one display to another, the object should stay under the user's finger. However, when the object encounters the boundary between the two displays, the first display has the correct position of the object, but the second display has a position that is a bit older. If the second display immediately processes the drag, the object may not have arrived yet, and the drag may be lost, or turned into an incorrect gesture. The same problem exists when the user is scrolling the shared view of the displays. A further problem is that the message delay as well as limits to bandwidth can cause scrolling started on the first display to look jerky and behind when it is mirrored on the second display.

U.S. Pat. No. 8,330,733B2 describes touch-sensitive display screens and interface software. The touch inputs and, in the case of a multi-screen workspace, the interface software is operable to allow inputs made in connection with a first screen to generate an inertial movement of a displayed object which results in the object moving to and coming to rest on another of the screens.

U.S. Patent Application No. 2011/0090155A1 describes a method for use by a touch screen device that includes detecting a first touch screen gesture at a first display surface of an electronic device, detecting a second touch screen gesture at a second display surface of the electronic device, and discerning that the first touch screen gesture and the second touch screen gesture are representative of a single command affecting a display on the first and second display surfaces.

International Patent Application Publication No. WO/2013046182A3 describes an apparatus comprising: a first display area; a second display area; and an interface separating the first display area from the second display area: and a display controller configured to control display of a user interface element in a first configuration when the user interface element is movable across the interface from the first display area to the second display area and a first criteria dependent upon a distance of the user interface element from the interface is satisfied and is configured to control display of the user interface element in a second configuration, different to the first configuration, when the user interface element is movable across the interface from the first display area to the second display area and the first criteria concerning a distance of the user interface element from the interface is not satisfied.

U.S. Pat. No. 8,751,970B2 describes embodiments of a multi-screen synchronous slide gesture. In various embodiments, a first motion input is recognized at a first screen of a multi-screen system, and the first motion input is recognized when moving in a particular direction across the first screen. A second motion input is recognized at a second screen of the multi-screen system, where the second motion input is recognized when moving in the particular direction across the second screen and approximately when the first motion input is recognized. A synchronous slide gesture can then be determined from the recognized first and second motion inputs.

U.S. Pat. No. 6,331,840B1 describe an apparatus and process where an object can be manipulated between multiple discontinuous screens from the others, this continuity being non-touch sensitive. First, a pointing implement contacts the source touch-screen to select the object, storing parameters in the computers buffer. The pointing implement is moved to the target touch-screen where the pointing implement contacts where the first object is to be dragged to; then the object is released from the buffer so that the first object is pasted to the target touch-screen. Preferably, when the object is touched at the source screen, a timer starts, and if the target screen is touched before timeout, the object appears at the target.

SUMMARY OF THE INVENTION

A system for handling gestures that cross between two or more displays which are physically adjacent. The system may include a computer for controlling the displays units, two or more displays which are touch enabled, a communications interface for communicating between display units and the server, and a server for storing the digital workspace background, shared objects, and ink data for remote device synchronization.

BRIEF DESCRIPTION OF THE DRAWINGS

FIGS. 2a(i) and 2a(ii) are detailed illustrations of dragging an object in the shared digital workspace across multiple display units in the system. FIGS. 2b(i) and 2b(ii) are detailed illustrations of scrolling the shared digital workspace across multiple display units in the system.

DETAILED DESCRIPTION OF THE PRESENTLY PREFERRED EXEMPLARY EMBODIMENTS

With reference to the drawings, a non-limiting illustrative embodiment will now be described. While the description below is given with respect to digital workspace and object sharing between two equally-sized, physically adjacent touch-sensitive displays, other combinations of devices may be used without departing from the spirit or scope of the attached claims. For example, the two displays need not be physically adjacent. Furthermore, three, four, five, six, nine or more displays may share the digital workspace. The server allows for a plurality of remote locations and devices to share the same digital workspace and objects for a contiguous and consistent experience and presentation. The devices may be any combination of large-screen display(s), monitor(s), laptop display(s), pad display(s), cellphone display(s), and the like.

Figure 1:
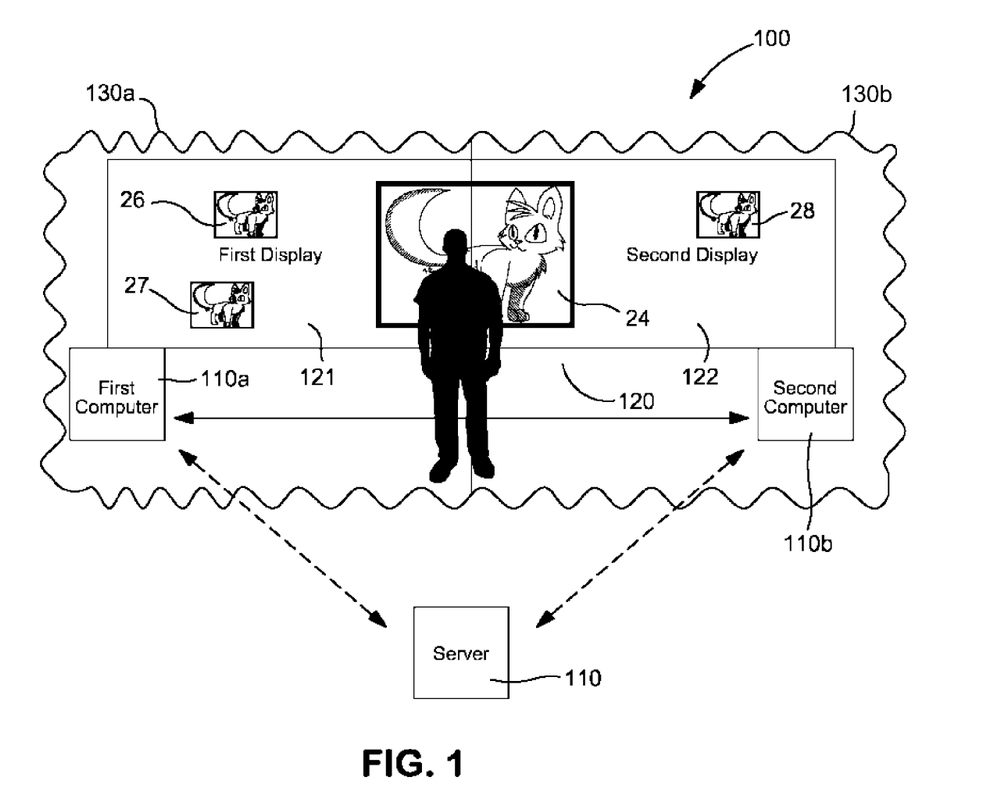
FIG. 1 is an illustration of a system having a shared digital workspace with a contiguous digital background and shared objects according to an embodiment of the present invention.

Conventional art may represent a system having a digital workspace stored on a server and accessed from a variety of devices. With reference to FIG. 1, system 100 illustrates a system having a shared digital workspace, where the shared digital workspace stored on a server 110, which server may be a cloud server, a host, or the like. Furthermore, system 100 may include display units 130(a) and 130(b) where each display unit consists of a computer (110(a) and 110(b)) and a touch display (121 and 122). Users of system 100, may interface with each display unit 130(a) and 130(b) by providing inputs such as touch gestures on the display 121 and 122.

Multiple objects (24, 26, 27, and 28) may be contained in the shared digital workspace on the server 110 where each object has an X and a Y coordinate that describes its position in the digital workspace.

As shown in FIG. 1, two display units 130a and 130b may be coordinated so that the display (121 and 122) are physically adjacent. Scrolling information may be contained in the shared digital workspace on the server 110 where the scrolling information comprises X and Y coordinates. Each display unit (130a, 130b) may show a portion of the shared digital workspace based on this scrolling information. The leftmost display unit 130a may show, for example, a rectangular subset of a shared document that starts at the scrolling X and Y location, and extends rightward by the width of the display. The next display unit (130b) may start at the same Y location, but its X location may begin where the display to its left (130a) finished, creating a contiguous view of the shared digital workspace and document.

Changes to the shared digital workspace (or document) may be communicated as network messages to the server 110. Some messages may bypass the server and be sent directly between display units.

Each display unit (130a and 130b) in the system supports touches from its attached display (121 and 122) using a stylus, finger, etc. Such contacts generally comprise down, move, and up (and sometimes leave and enter) events. Touches are local to one display. When a touch moves outside the display boundary an up or a leave event is generated. When a touch enters from outside the display boundary, a down or enter event is generated.

Many possible gestures may be input by a user(s) onto the display units (130a. 130b) in the system. Gestures may include, but are not limited to dragging, inking, and scrolling. These gestures may cross from one display unit 130a, across the boundary 123, and onto an adjacent display unit 130b.

Figure 2A:
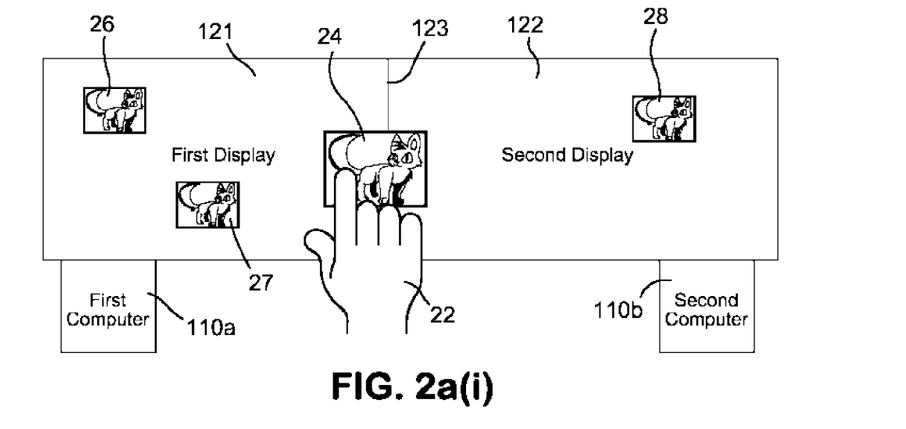
Figure 2B:
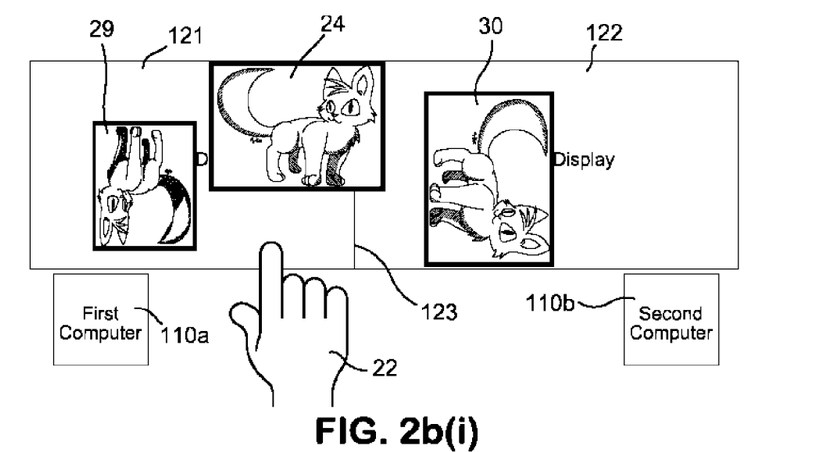
Figure 2C:
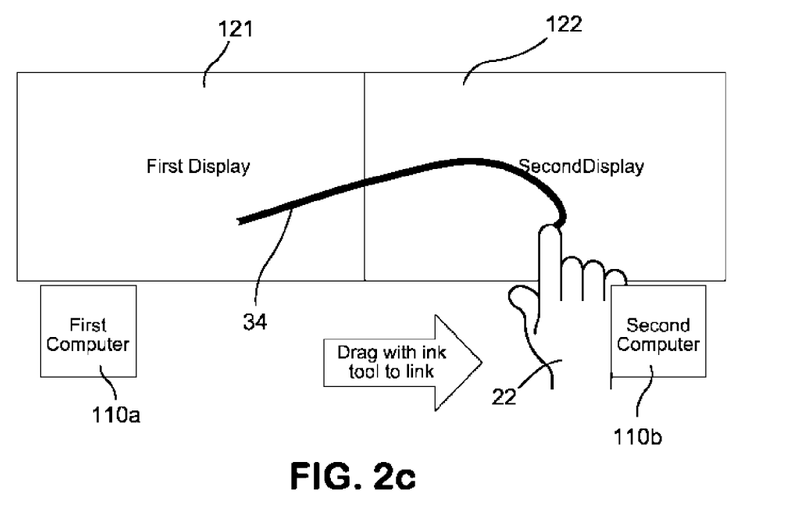
FIG. 2c is a detail illustration of inking on the shared digital workspace across multiple display units in the system.

The present digital workspace allows the users to drag objects (e.g., 24, 26, 27, and 28) in a digital workspace. FIGS. 2a(i) and (ii) show the user 22 dragging an object 24 across the intersection 123 of the two display units 130a and 130b where the display units are physically adjacent and share digital workspace information so that they appear contiguous. In FIGS. 2a(i) and (ii), note that the other objects 26, 27, and 28 on the displays remain in their original positions during and after the dragging operation. FIGS. 2b(i) and (ii) illustrate the user 22 scrolling a background of the digital workspace or a shared document, thus objects 24, 29, and 30 move together with the background as the user 22 scrolls the digital workspace (or document). In FIG. 2c, the user 22 draws (inks) a line 34 across the display units 130a and 130b.

Figure 3:
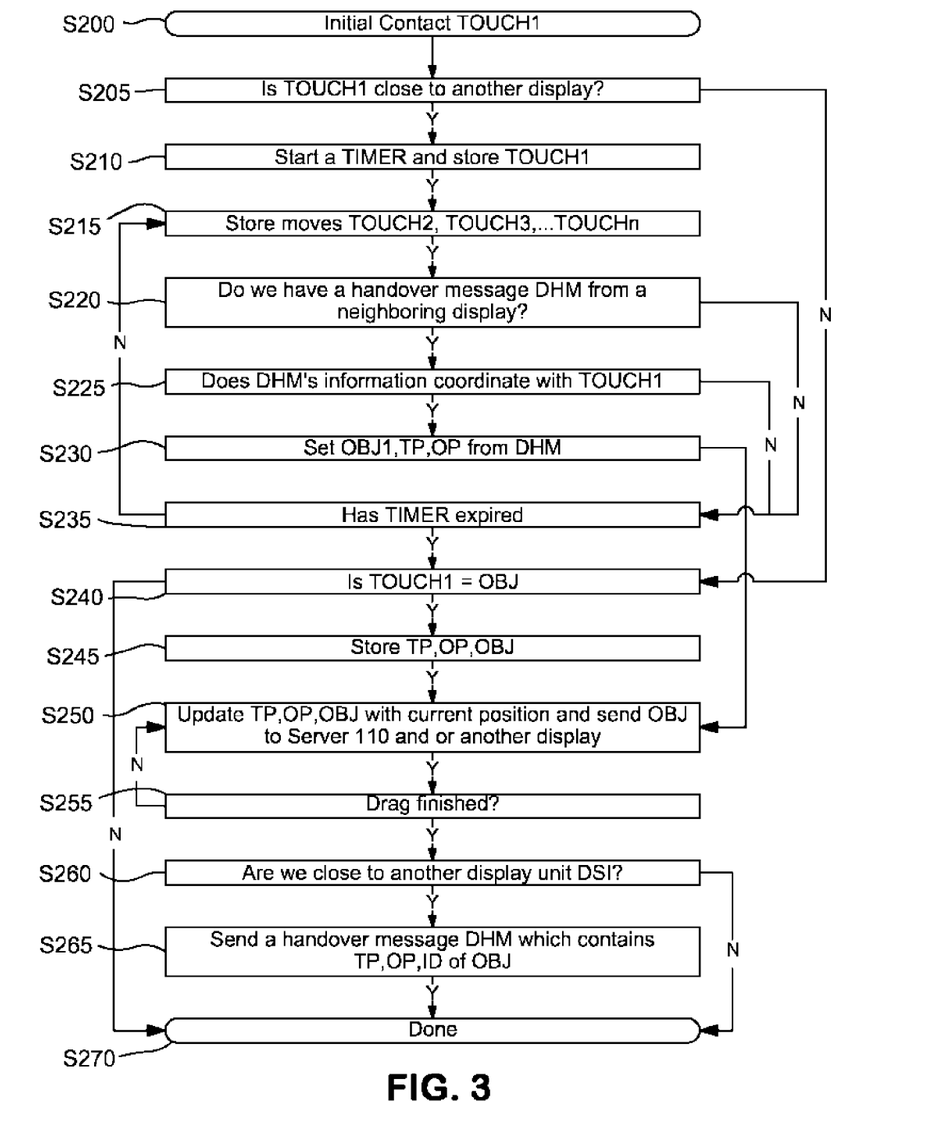
FIG. 3 is a detailed flowchart of dragging an object in the shared digital workspace across multiple display units in the system.

FIG. 3 depicts a process, which may be embodied in instructions of a software program on the system, for the dragging of an object across the two physically adjacent display units in the system, and is described hereinafter. The program of computer instructions may be stored in one or more computer-readable medium(s) stored in combination of one or more of server 110, first computer 110a, and second computer 110b. When executed by one or more processors using ROM and RAM in the one or more of server 110, first computer 110a, and second computer 100b, those processors cause the actions described in FIG. 3.

In step S200, a touch down, TOUCH1 consisting of X and Y coordinates is detected, e.g., on the display 121. In step S205, it is determined whether TOUCH1 is close to the adjacent display 122. If the touch is not close, the process goes to step S240. Otherwise, the touch may be the continuation of a drag that started on display 122. So at step S210, the program stores TOUCH1, and initializes a countdown timer TIMER, where the length TIMER is preferably determined by the time it takes to send a message from computer 110b to computer 110a. In step S215, subsequent moves TOUCH2, TOUCH3 . . . TOUCHN are saved. At step S220 if no drag handover message (DHM) was received from the adjacent display unit 122, the process goes to step S235. DHM may be in the form DHM: (Object=ID, TouchPosition=X,Y, ObjectPosition=X,Y). At step S225, the program compares TouchPosition in DHM to TOUCH1. If the distance between these is too large, the touches are unrelated and the program jumps to S235.

In step S230, the information in DHM is used to set the object being dragged (OBJ1), the touch position TP, and the object position OP. From here, the program jumps to S250. In step S235, it is determine if TIMER has expired. If it has expired, then the stored touches TOUCH1-TOUCHN were not a continuation of a drag on adjacent display unit 130b. In this case, the program jumps to step S240. Otherwise the program goes back to step S215. At step S240, the program determines if TOUCH1 is on an object OBJ. If it is on an object, then the program proceeds to step S245. Otherwise, the program jumps to step S270. In step S245, the touch position TP (consisting of the X and Y coordinates of TOUCH1), the object position OP (consisting of the X and Y position of OBJ) and the object being dragged OBJ are all stored. At step S250, the current touch position is obtained. TP is updated using the X and Y of the current position. OP is updated by moving it the distance between the old and new TP, and OBJ is moved to the new OP causing the object to move to the new touch position. The updated position of OBJ is sent to the server 110 and (either directly or via the server) to display unit 130b.

In step S255, the program checks if the drag is completed by looking for an up or leave event. If the drag is not finished the program goes to step S250. If the drag is finished, then at step S260, the program checks if the final location of the drag is close to the adjacent display 122. If this is not the case, the program jumps to S270. If the drag is close to the adjacent display 122, then it is possible that the user will continue the drag onto the adjacent display unit 130b. So in step S265, the program sends a drag handover message DHM (which contains the last known touch position TP and object position OP and the ID of the object being dragged OBJ). The message is sent to the adjacent display unit 130b, either directly or via the server. At step S270, the drag sequence is finished. The program restarts each time a new touch down event is encountered.

Figure 4:
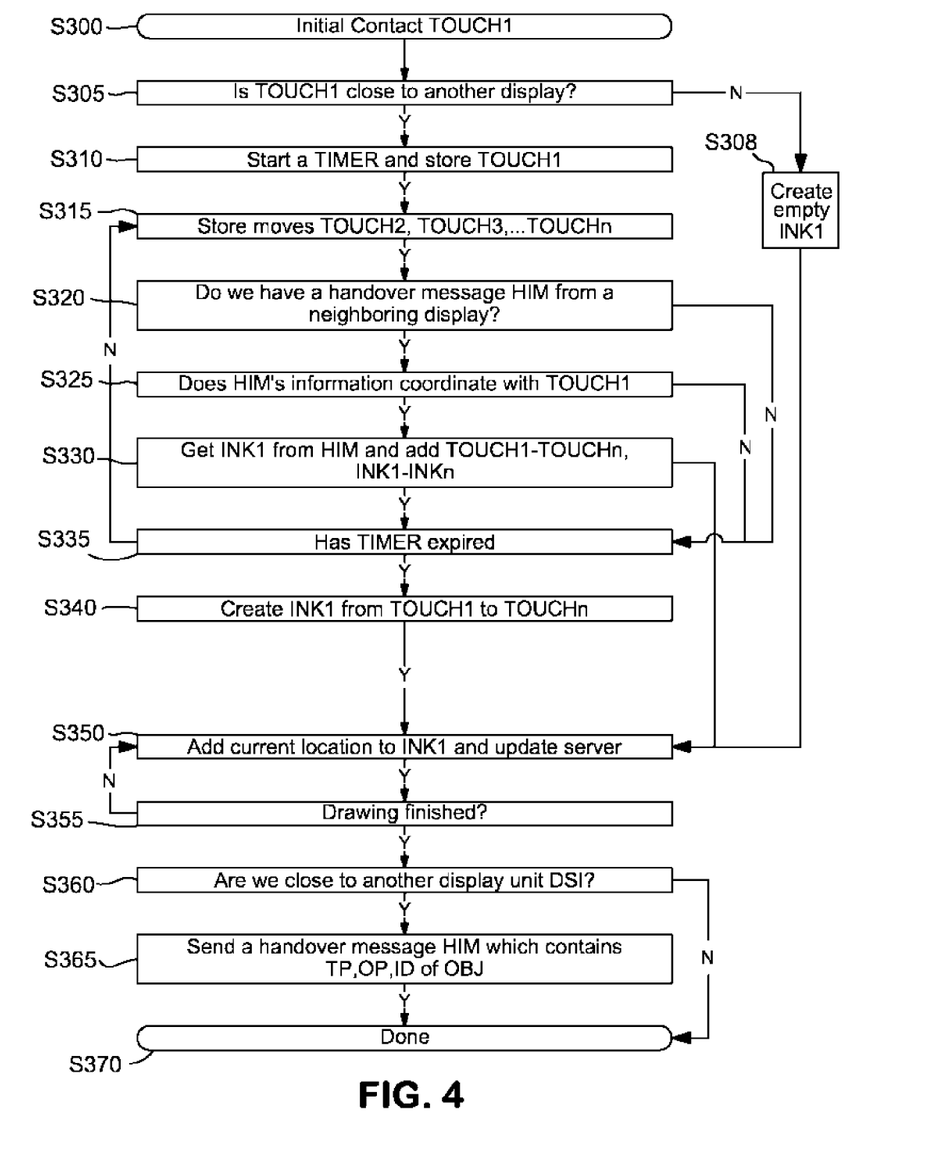
FIG. 4 is a detailed flowchart of inking on the shared digital workspace across multiple display units in the system.

In the present invention, a shared document allows the users to ink in the shared document, where ink strokes may be considered as a series of connected segments created by at least two touch points. FIG. 2c illustrates a user 22 drawing an ink stroke 34 across the boundary 123 between the adjacent displays 121 and 122. FIG. 4 depicts a process, which may be embodied in instructions of software on the system, for inking on a shared document across two physically adjacent display units. It is described hereinafter from the perspective of computer 110a on display unit 130a.

In step S300, a touch down TOUCH1 is detected on display 121. In step S305, it is determined whether TOUCH1 is close to the adjacent display 122. If the touch is not close, go to step S350 through step S308 where an empty ink stroke is initiated. Otherwise, the touch may be the continuation of ink that started on display 122. So in step S310, the program stores TOUCH1 and initializes a countdown timer TIMER, where the length of TIMER is preferably determined by the time it takes to send a message from computer 110b to computer 110a. In S315, subsequent moves TOUCH2, TOUCH3 ... TOUCHN are saved. At step S320, if no handover ink message (HIM) was received from the adjacent display unit 122, go to step S335. HIM contains (INK1 ID=1234. Color-color, Width-width. InkPoints (Ink1=x1,y1 Ink2=x2,y2 ... InkN=xn,yn)). At step S325, the program compares the position of the final ink point InkN in HIM with TOUCH1. If the distance between these is too large, the ink strokes are unrelated and the program jumps to S335.

At step S330, the electronic ink stroke INK1 is retrieved from the handover ink message HIM. The stored touch points TOUCH1-TOUCHN are added to the tall of the ink (Ink1-InkN) and the server 110 is updated with the new ink. The program then jumps to step S350. In step S335, the program determines if TIMER has expired. If it has expired, then the stored touches TOUCH1-TOUCHN were not a continuation of ink from adjacent display unit 130b. In this case the program jumps to S340. Otherwise, the program goes back to step S315. At step S340, the program creates a new ink stroke INK1 out of the TOUCH1-TOUCHN coordinates. In step S350, the current touch location is added to INK1, and the server 110 is updated accordingly.

At step S355, the program checks if the inking is finished by looking for an up or leave event. If the inking is not finished, the program goes to S350. If the inking is finished, then at step S360, the program checks if the ink ended close to the adjacent display 122. If this is not the case, then the program jumps to S370. If the ink ended close to the adjacent display, it s possible that the user will continue ink onto the adjacent display unit 130b. So, at step S365, the program sends a handover ink message HIM, which contains an ink stroke (Ink1=TOUCH1, Ink2=TOUCH2, ... InkN=TOUCHN) and data about the color and size of the ink stroke. At step S370, the inking sequence is finished. The program restarts each time a new touch down event is encountered.

Figure 5:
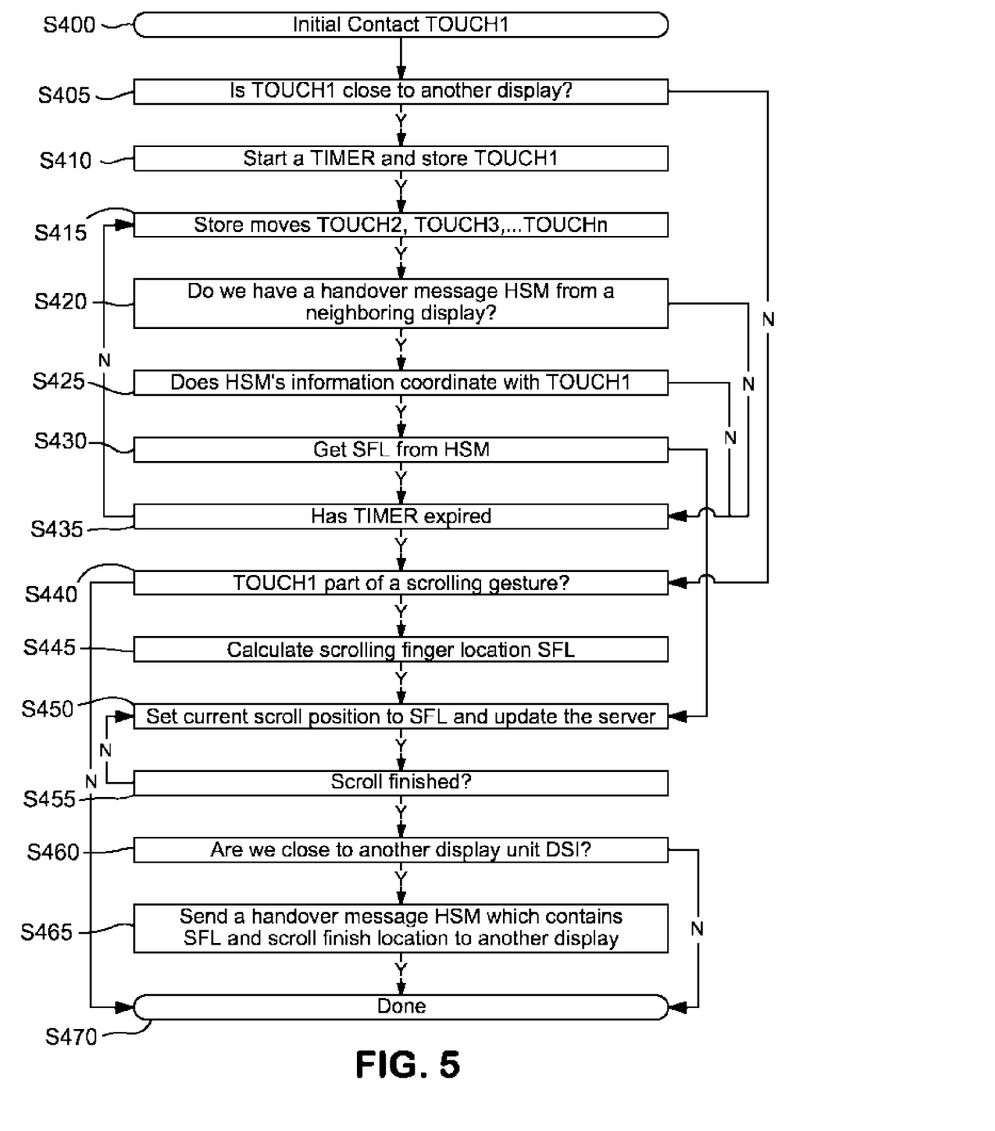
FIG. 5 is detailed flowchart of scrolling the shared digital workspace across multiple display units in the system.

In the present invention, a shared workspace or document can be scrolled in a coordinate manner on the display units so that it presents a contiguous view to the user. FIGS. 2b(i) and 2b(ii) Illustrate a user 22 scrolling across the boundary 123 between the adjacent displays (121 and 122). FIG. 5 depicts a process, which may be embodied in instructions of software on the system, for scrolling on a shared workspace or document across two physically adjacent display units. It is described hereinafter from the perspective of computer 110a on display unit 130a.

In step S400, a touch down TOUCH1 is detected on display 121. In step S405, it is determined whether TOUCH1 is close to the adjacent display 122. If the touch is not close, go to step S440. Otherwise, the touch may be the continuation of scrolling that started on display 122. So at step S410, the program stores TOUCH1 (as a raw screen coordinate) and initializes a countdown timer TIMER, where the length of the timer is preferably determined by the time it takes to send a message from computer 110b to computer 110a. Raw screen coordinates are used because scrolling changes the coordinate system relative to the shared workspace. At step S415, subsequent moves TOUCH2. TOUCH3 ... TOUCHN are saved. At step S420, if no handover scroll message (HSM) is received from the adjacent display unit 122, go to step S435. HSM may be of the form (ScrollFingerLocation=x,y RawScreenLocation=x, y). At step S425, the program compares the position of RawScreenLocation with TOUCH1 and determines if TOUCH1 is a continuation of the same scroll. If it is not, then the scroll events are unrelated and the program jumps to S435.

At step S430, the ScrollFingerLocation (SFL) is retrieved from the handover scroll message HSM. The scroll position of the shared workspace or document on the display unit s adjusted so that the current touch is over the same point on the shared workspace or document as it was when the HSM was generated. The program then jumps to step S450. At step S435, the program determines if the countdown timer TIMER has expired. If it has, then the program knows that the stored touches TOUCH1-TOUCHN were not a continuation of a scroll from adjacent display 122. In this case, the program jumps to step S440. Otherwise, the program go back to step S415. In step S440, the program determines if TOUCH1 is the start of a scrolling gesture. In this embodiment, a scrolling gesture is a touch on the background of the shared workspace or document. If it is not, the program is jumps to step S470. If it is a scroll start, then step at S445, the scroll finger location SFL is calculated. The scroll finger location is the location of the touch in shared workspace/ document coordinates. At step S450, the current touch location is compared to the SFL, and the shared workspace or document is scrolled so that the current touch location and SFL match. The current position of the scrolling is updated on the server 110.

At step S455, the program checks to see if the scroll is finished by looking for an up or leave event. If the scroll is not finished, the program goes back to step S450. If the scroll is finished then at step S460, the program checks to see if the scroll finished close to neighboring display 122. In this case, it is possible that the user may be continuing the scroll on the neighboring display 122, and the program jumps to step S465. Otherwise, the program goes to step S470. In step S465, a handover scroll message (HSM) is sent to the neighboring display unit 130b. This message contains SFL as well as the location on the screen where the scroll finished. At step S470, the program terminates.

According to an embodiment of the invention, system 100 may incorporate peer-to-peer servers in cooperation with multiple displays for implementing a shared digital workspace with a contiguous background. And display devices can be touch screen monitors of any size, wall projection displays, display tables, and mobile devices, such as phones and portable computers (e.g., Pads) that are used to present a contiguous digital background workspace. In addition, the touch gestures and corresponding events of the present invention may be implemented for proximity or movement-based gestures, such as "hover" gestures, VR/AR (virtual reality/augmented reality) user interfaces, and the like.

The present invention is disclosed herein in terms of preferred embodiments thereof, which provides method and apparatus for using gestures across multiple display devices, as defined in the appended claims. Various changes, modifications, and alterations in the teachings of the present invention may be contemplated by those skilled in the art without departing from the intended spirit and scope of the appended claims. It is intended that the present invention encompass such changes and modifications.

What is claimed is:

1. A method of processing and displaying effects of a single continuous gesture that crosses over a plurality of displays comprising (i) a first display coupled to at least one first computing apparatus and (ii) a physically adjacent second display coupled to at least one second computing apparatus, the single continuous gesture comprising (a) dragging an object, (b) drawing an ink stroke, or (c) scrolling over the first display and the second display, the first and second computing apparatuses being physically separate computing devices which communicate with each other through and are coupled to at least one server having a shared digital workspace stored thereupon, the method comprising steps of:
 (a) detecting a TOUCH1 gesture on the first display to determine whether the TOUCH1 gesture is a continuation of a gesture on the second display, wherein the first display shows a first portion of the shared digital workspace;
 (b) determining whether the TOUCH1 gesture is within a predetermined proximity to a boundary with the second display;
 (c) storing information corresponding to the TOUCH1 gesture in a server memory of the at least one server and if the TOUCH1 gesture is within the predetermined proximity to the boundary to the second display, initializing a countdown timer by setting a length of the timer corresponding to a time it takes to send a message between the at least one first computing apparatus and the at least one second computing apparatus;
 (d) detecting and storing one or more subsequent TOUCH2 to TOUCHN gestures;
 (e) determining whether a handover message has been received from the second computing apparatus to the first computing apparatus, wherein the handover message includes information comprising (i) an effect of the single continuous gesture and (ii) information indicative of a location of the gesture on the second display based on which the handover message has been sent;
 (f) if the handover message has been received, determining whether the handover message coordinates with the TOUCH1 gesture;
 (g) if the handover message coordinates with TOUCH1 gesture, updating the TOUCH1 to TOUCHN gestures based on the information of the handover message; and executing the effect of the TOUCH2 to TOUCHN gestures as a single continuous gesture extending from the TOUCH1 gesture on the first display over the second display, wherein the single continuous gesture comprises dragging an object, drawing an ink stroke, or scrolling over the first display and the second display based on the information of the received handover message;
 (h) if the handover message has not been received or if the handover message does not coordinate with the TOUCH1 gesture, determining whether the timer has timed out;
 (i) if the timer has not timed out, repeating the steps of (d) through (h); and
 (j) if the timer has timed out, updating the server memory with the current position of the TOUCHN gesture.

2. The method of claim 1, further comprising:
 checking whether the single continuous gesture on the first display is finished;
 checking whether a final gesture of the single continuous gesture on the first display is within the predetermined proximity to the boundary to a third display if the single continuous gesture on the first display is finished;
 sending another handover message if the final gesture is within the predetermined proximity to the boundary to a third display; and
 detecting a TOUCHN+1 gesture on the third display to determine whether the TOUCHN+1 gesture is a continuation of the single continuous gesture on the first display.

3. The method of claim 2, wherein the TOUCH1 to 1 gestures are displayed as one single continuous gesture across the first, and third displays.

4. The method of claim 3, wherein said at least one server is updated with locations of the TOUCH1 to TOUCHN+1 gestures.

5. The method of claim 1, wherein the handover message is a drag handover message (DHM) and the effects of the TOUCH1 to TOUCHN gestures comprises a movement of one or more objects displayed on the first display.

6. The method of claim 1, wherein the handover message is a handover scroll message (HSM) and the effects of the TOUCH1 to TOUCHN gestures comprises scrolling the shared digital workspace which is displayed on the first display and the second display.

7. The method of claim 1, wherein the handover message is a handover ink message (HIM) and the effects of the TOUCH1 to TOUCHN gestures comprises inking a shared document that is displayed on the first display, wherein the inking is displayed as a single continuous gesture on the first display and the second display.

8. Program code embodied in at least one non-transitory computer readable medium for processing and displaying effects of a single continuous gesture that crosses a plurality of displays comprising (i) a first display coupled to at least one first computing apparatus and (ii) a physically adjacent second display coupled to at least one second computing apparatus, the single continuous gesture comprising (a) dragging an object, (b) drawing an ink stroke, or (c) scrolling over the first display and the second display, the first and second computing apparatuses being physically separate computing devices which communicate with each other through and are coupled to at least one server having a shared digital workspace stored thereupon, said program comprising instructions causing at least one processor to perform steps of:
  (a) detecting a TOUCH1 gesture on the first display to determine whether the TOUCH1 gesture is a continuation of a gesture on the second display, wherein the first display shows a first portion of the shared digital workspace;
  (b) determining whether the TOUCH1 gesture is within a predetermined proximity to a boundary with the second display;
  (c) storing information corresponding to the TOUCH1 gesture in a server memory of the at least one server and if the TOUCH1 gesture is within the predetermined proximity to the boundary to the second display, initializing a countdown timer by setting a length of the timer corresponding to a time it takes to send a message between the at least one first computing apparatus and the at least one second computing apparatus;
  (d) detecting and storing one or more subsequent TOUCH2 to TOUCHN gestures;
  (e) determining whether a handover message has been received from the second computing apparatus to the first computing apparatus, wherein the handover message includes information comprising (i) an effect of the single continuous gesture and (ii) information indicative of a location of the gesture on the second display based on which the handover message has been sent;
  (f) if the handover message has been received, determining whether the handover message coordinates with the TOUCH1 gesture;
  (g) if the handover message coordinates with TOUCH1 gesture, updating the TOUCH1 to TOUCHN gestures based on the information of the handover message; and executing the effect of the TOUCH2 to TOUCHN gestures as a single continuous gesture extending from the TOUCH1 gesture on the first display over the second display, wherein the single continuous gesture comprises dragging an object, drawing an ink stroke, or scrolling over the first display and the second display based on the information of the received handover message;
  (h) if the handover message has not been received or if the handover message does not coordinate with the TOUCH1 gesture, determining whether the timer has timed out;
  (i) if the timer has not timed out, repeating the steps of (d) through (h); and
  (j) if the timer has timed out, updating the server memory with the current position of the TOUCHN gesture.

9. The program code of claim 8, further comprising instructions to cause the at least one processor to perform:
  checking whether the single continuous gesture on the first display is finished;
  checking whether a final gesture of the single continuous gesture on the first display is within the predetermined proximity to the boundary to a third display if the single continuous gesture on the first display is finished;
  sending another handover message if the final gesture is within the predetermined proximity to the boundary to a third display; and
  detecting a TOUCHN+1 gesture on the third display to determine whether the TOUCHN+1 gesture is a continuation of the single continuous gesture on the first display.

10. The program code of claim 9, further comprising instructions to cause the at least one processor to cause the TOUCH1 to TOUCHN+1 gestures to be displayed as one single continuous gesture across the first, second, and third displays.

11. The program of claim 10, further comprising instructions to cause the at least one processor to cause said at least one server to be updated with locations of the TOUCH1 to TOUCHN+1 gestures.

12. The program of claim 8, wherein the handover message is a drag handover message (DHM), the program further comprising instructions to cause the at least one processor to display the effects of the TOUCH1 to TOUCHN gestures as a movement of one or more objects displayed on the first display.

13. The program of claim 8, wherein the handover message is a handover scroll message (HSM), the program further comprising instructions to cause the at least one processor to display the effects of the TOUCH1 to TOUCHN gestures as a scrolling the shared digital workspace which is displayed on the first display and the second display.

14. The program of claim 8, wherein the handover message is a handover ink message (HIM), the program further comprising instructions to cause the at least one processor to display inking a shared document that is displayed on the first display, wherein the inking is displayed as a single continuous gesture on the first display and the second display.

15. Apparatus configured for processing and displaying effects of a single continuous gesture that crosses over a plurality of displays comprising (i) a first display coupled to at least one first computing apparatus and (ii) a physically adjacent second display coupled to at least one second computing apparatus, the single continuous gesture comprising (a) dragging an object, (b) drawing an ink stroke, or (c) scrolling over the first display and the second display, the first and second computing apparatuses being physically separate computing devices which communicate with each other through and are coupled to at least one server having a shared digital workspace stored thereupon, comprising:
  the at least one server; and
  at least one processor coupled to said at least one server, and configured to:
  (a) detect a TOUCH1 gesture on the first display to determine whether the TOUCH1 gesture is a continuation of a gesture on the second display, wherein the first display shows a first portion of the shared digital workspace;
  (b) determine whether the TOUCH1 gesture is within a predetermined proximity to a boundary with the second display;
  (c) store information corresponding to the TOUCH1 gesture in a server memory of the at least one server and if the TOUCH1 gesture is within the predetermined proximity to the boundary to the second display initialize a countdown timer by setting a length of the timer corresponding to a time it takes to send a message between the at least one first computing apparatus and the at least one second computing apparatus;

(d) detect and store one or more subsequent TOUCH2 to TOUCHN gestures;

(e) determine whether a handover message has been received from the second computing apparatus to the first computing apparatus, wherein the handover message includes information comprising (i) an effect of the single continuous gesture and (ii) information indicative of a location of the gesture on the second display based on which the handover message has been sent;

(f) if the handover message has been received, determine whether the handover message coordinates with the TOUCH1 gesture;

(g) if the handover message coordinates with TOUCH1 gesture, updating the TOUCH1 to TOUCHN gestures based on the information of the handover message; and execute the effect of the TOUCH2 to TOUCHN gestures as a single continuous gesture extending from the TOUCH1 gesture on the first display over the second display, wherein the single continuous gesture comprises dragging an object, drawing an ink stroke, or scrolling over the first display and the second display based on the information of the received handover message;

(h) if the handover message has not been received or if the handover message does not coordinate with the TOUCH1 gesture, determine whether the timer has timed out;

(i) if the timer has not timed out, repeating (d) through (h); and (j) if the timer has timed out, updating the server memory with the current position of the TOUCHN gesture.

16. The apparatus of claim 15, wherein said at least one processor is configured to:

checking whether the single continuous gesture on the first display is finished;

checking whether a final gesture of the single continuous gesture on the first display is within the predetermined proximity to the boundary to a third display if the single continuous gesture on the first display is finished;

sending another handover message if the final gesture is within the predetermined proximity to the boundary to a third display; and detect a TOUCHN+1 gesture on the third display to determine whether the TOUCHN+1 gesture is a continuation of the single continuous gesture on the first display.

17. The apparatus of claim 16, wherein said at least one processor is configured to display the TOUCH1 to TOUCHN+1 gestures as one single continuous gesture across the first, second, and third displays.

18. The apparatus of claim 17, wherein said at least one processor is configured to update said at least one server with locations of the TOUCH1 to TOUCHN+1 gestures.

19. The apparatus of claim 15, wherein the handover message is a drag handover message (DHM) and said at least one processor is configured such that the effects of the TOUCH1 to TOUCHN gestures comprises a movement of one or more objects displayed on the first display.

20. The apparatus of claim 15, wherein the handover message is a handover scroll message (HSM) and said at least one processor is configured such that the effects of the TOUCH1 to TOUCHN gestures comprises scrolling the shared digital workspace which is displayed on the first display and the second display.

21. The apparatus of claim 15, wherein the handover message is a handover ink message (HIM) and said at least one processor is configured such that the effects of the TOUCH1 to TOUCHN gestures comprises inking a shared document that is displayed on the first display, wherein the inking is displayed as a single continuous gesture on the first display and the second display.

* * * * *